G. KUSUTANI.
TREE SAWING MACHINE.
APPLICATION FILED AUG. 19, 1919.
1,349,772.
Patented Aug. 17, 1920.
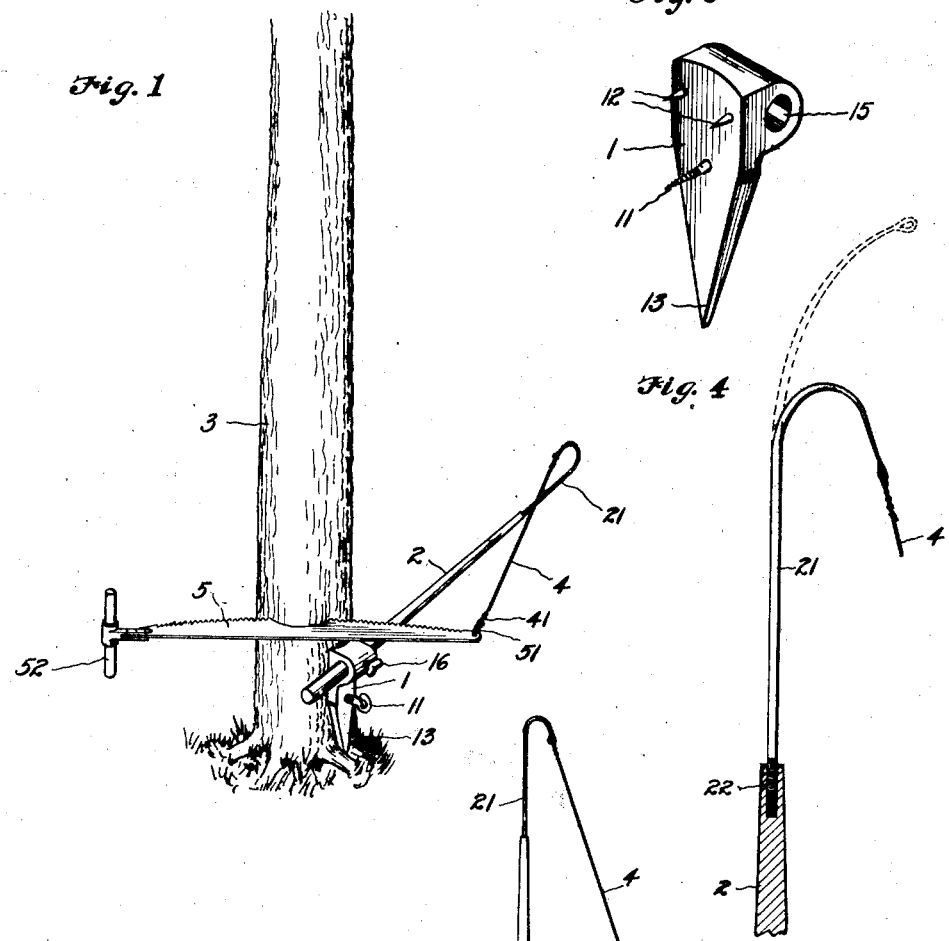
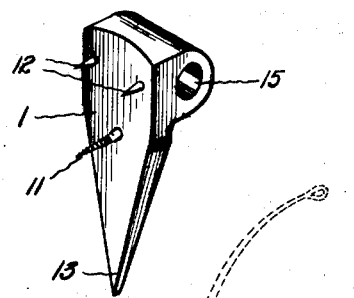
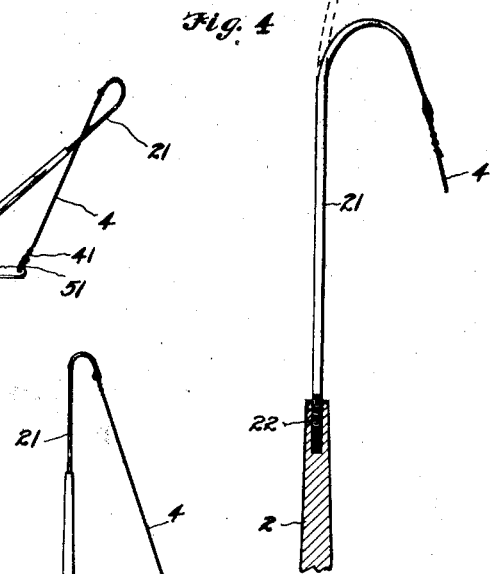
Inventor
GIKICHI KUSUTANI
By Reynolds & Cook
Attorney

UNITED STATES PATENT OFFICE.

GIKICHI KUSUTANI, OF SEATTLE, WASHINGTON.

TREE-SAWING MACHINE.

1,349,772.                Specification of Letters Patent.    Patented Aug. 17, 1920.

Application filed August 19, 1919. Serial No. 318,514.

*To all whom it may concern:*

Be it known that I, GIKICHI KUSUTANI, a subject of the Emperor of Japan, and resident of Seattle, in the county of King and State of Washington, have invented certain new and useful Improvements in Tree-Sawing Machines, of which the following is a specification.

My invention comprises an improvement in tree-sawing machines, and consists of the novel parts and combinations of parts which are shown in the accompanying drawings, described in the specification, and defined by the claims.

The object of my invention is to provide means whereby a tree may be felled by means of sawing by one man working alone. To this end I provide a means for supporting one end of a long saw and for holding it against the tree when the operator saws with the other end of the saw.

In the accompanying drawings I have shown my device in its present preferred form.

Figure 1 is a perspective of a tree having my device secured in place upon it, showing the saw as having partly cut through the tree.

Fig. 2 is a section through the tree trunk, looking down upon my device.

Fig. 3 is a perspective view of my supporting standard.

Fig. 4 is a section through the outer end of the boom.

In using my device, I first back-cut the tree trunk with an ax upon the side toward which I wish it to fall, and then begin sawing upon the opposite side, slightly higher up, as is commonly the practice. In Fig. 2 the back-cut 31 is indicated by dotted lines.

At one side of the tree, and as near the ground as may be desirable, I secure the standard 1 upon the tree trunk 3. As herein shown, a bolt 11 passes through the standard and is driven or screwed, or both, into the tree trunk a sufficient distance to securely hold the standard upon the trunk. Two or more pins 12, projecting from the face of the standard which is toward the trunk, and which is preferably concavely curved, are adapted to project into the trunk and to prevent turning about the bolt 11. Another means of preventing turning of the standard, which may be used in connection with the pins 12, or independently of them, is to sharpen the lower end 13 of the standard. It may then be driven into the ground, or it may be wedged between two roots, to thereby securely hold the standard.

At the upper end of the standard a transverse guide 15 is provided in which a boom 2 is mounted to slide longitudinally. By means of a set screw 16 its position may be fixed. The boom is mounted to project laterally from the tree trunk.

In the outer end of the boom a flexible whip-arm 21 is mounted in any suitable manner, as by screw threads 22. The free end is flexible in somewhat the same manner as a fish-pole, as shown in Fig. 4, and has secured therein a link 4, of wire or any suitable material. The other end of this link 4 is connected to an end of a saw 5 by any suitable means. The means herein shown comprise a hook 41 secured to the end of the link, and engaging a loop or ring 51 which is secured in the saw.

A woodsman, after back-cutting the tree as described above, secures the standard 1 to the tree at the proper height, adjusts the boom 2 in the guide 15, and connects the ring 51 and hook 41. He may then rest the saw upon the standard 1 or the boom 2, and begin sawing, holding the handle 52, or he may support the saw above the standard until it is well started. The whip-arm 21 and the link 4 permit the saw to yield and swing, and yet holds it and presses it firmly against the bottom of the saw-cut. The tree may thus be felled by a single woodsman.

What I claim as my invention is:

1. A tree-sawing machine comprising a boom, means for securing said boom to a tree trunk to project laterally therefrom, a saw, a flexible whiparm secured in the outer end of said boom, and a link connecting the free end of said whiparm to an end of the saw to permit relative movement of the saw transversely of the boom.

2. A tree-sawing machine comprising a boom, a standard for said boom having its lower end pointed and adapted to be secured upon a tree trunk, said boom being adjustable longitudinally in the standard, and projecting laterally from the tree, a saw and a link connecting an end of the saw with an end of the boom to permit a relative rocking movement between itself and both the saw and boom.

3. A tree-sawing machine comprising a boom, a standard for said boom having its face which is toward the tree trunk curved and fitting against the tree, a bolt passing through said standard and adapted to secure the standard to a tree trunk, spaced pins projecting from the inner curved surface of the standard and adapted to engage the tree trunk, said boom being adjustable longitudinally in the standard, and projecting laterally from the tree, a saw, and a link connecting an end of the saw with an end of the boom to permit a relative rocking movement between itself and both the saw and boom.

Signed at Seattle, Washington, this 11th day of August, 1919.

GIKICHI KUSUTANI.